March 31, 1931.   V. O. CORNWELL   1,798,308
APPARATUS FOR MANUFACTURING STEMMED AND FOOTED GLASSWARE
Original Filed March 19, 1926    2 Sheets-Sheet 1
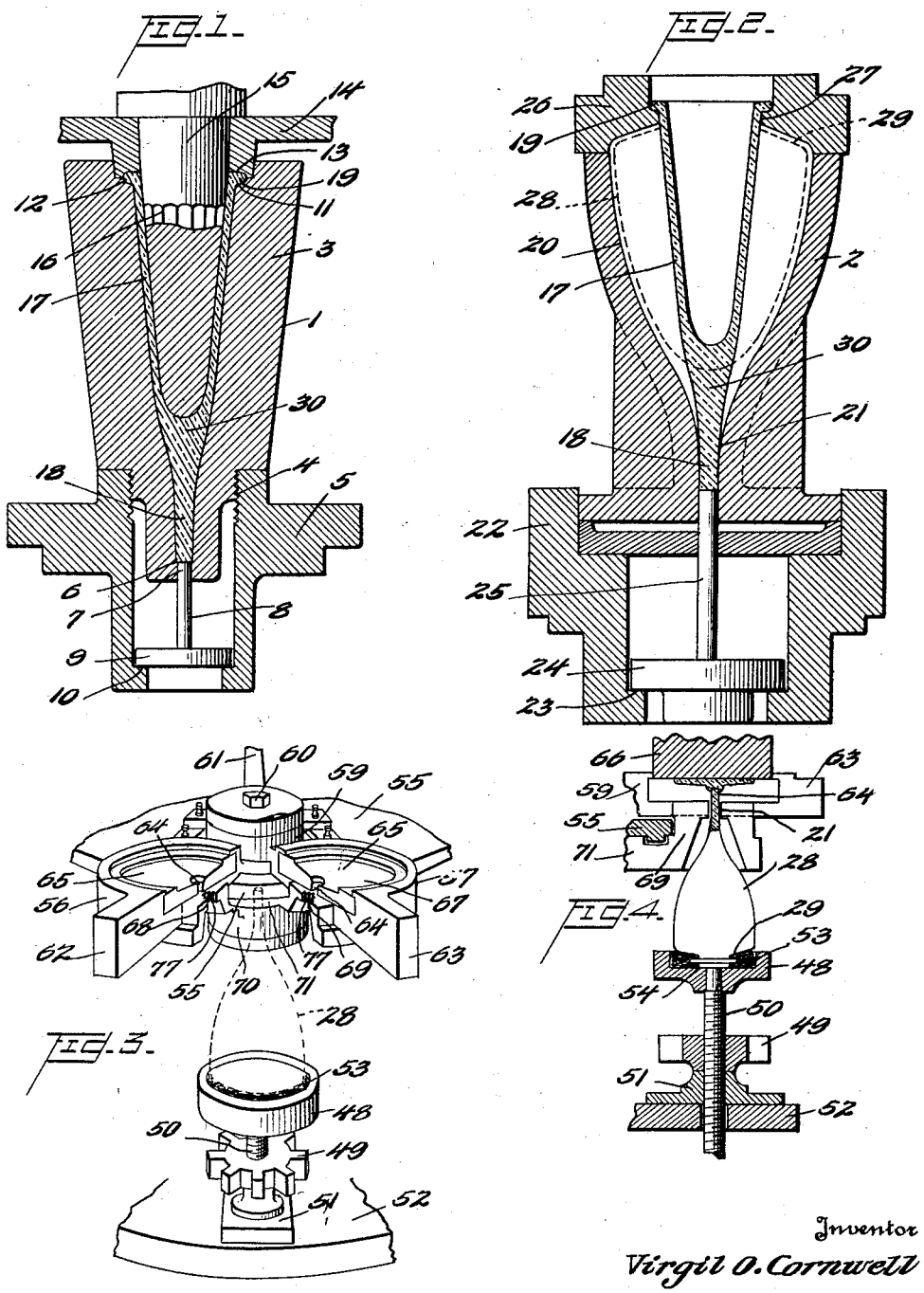
Inventor
Virgil O. Cornwell
By Edwin P. Corlett
Attorney

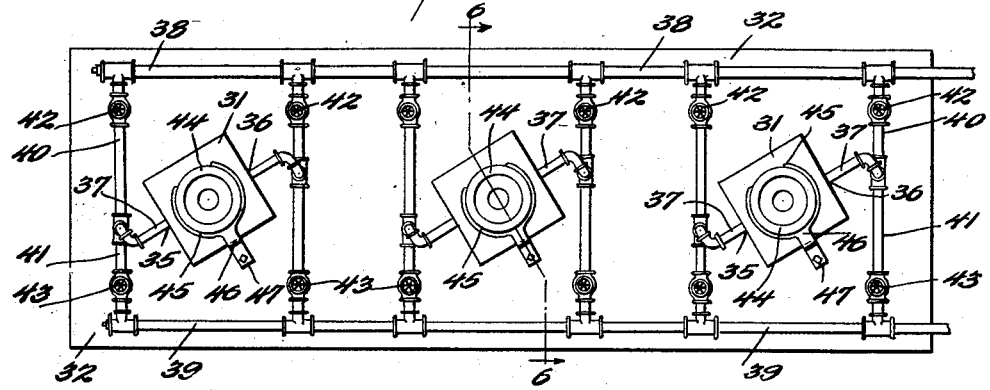

Patented Mar. 31, 1931

1,798,308

UNITED STATES PATENT OFFICE

VIRGIL O. CORNWELL, OF COLUMBUS, OHIO, ASSIGNOR TO THE FEDERAL GLASS COMPANY, OF COLUMBUS, OHIO, A CORPORATION OF OHIO

APPARATUS FOR MANUFACTURING STEMMED AND FOOTED GLASSWARE

Original application filed March 19, 1926, Serial No. 95,882. Divided and this application filed April 22, 1927. Serial No. 185,733.

This invention relates to a method and apparatus for manufacturing stemmed and footed glassware and has to do particularly with the mechanical production of high quality thin-walled articles, such as are commonly made by manual methods.

This application is a division of my copending application Serial No. 95,882, filed March 19, 1926, Method and apparatus for manufacturing stemmed and footed glassware.

The primary object of this invention is the provision of a mechanical method of producing stemmed and footed glassware of a quality which has heretofore been manufactured by laborious and costly manual processes.

A further object of this invention resides in the provision of a method and apparatus for producing such articles by the press and blow method, thereby obviating the necessity of building and using special forming machines.

A further object of this invention is to provide a press mold which embodies a novel ejector of such construction that the formation of defective stems and sticking of the ejector due to small detached particles of glass or other foreign particles in the mold is avoided.

A further object is to provide a novel ejector in combination with the blow mold to assist in removing the blown article from the blow mold.

A still further object of this invention resides in the provision of a novel furnace arrangement whereby the stems of a plurality of partially completed articles may be simultaneously heated before attachment of the feet.

Another object of this invention has to do with the provision of a foot mold for attaching feet to previously formed integral bowls and stems while being supported by an adjustable support that makes possible the use of one machine for producing a variety of different sized articles.

A still further object of this invention is the provision of a novel device embodied in the foot molds for properly centering the stems before attachment of the feet to avoid breakage and defective articles.

With the above and other objects in view this method consists in first forming an integral blow blank and stem, transferring the article so shaped to a blow mold, expanding the blow blank into a bowl having an integral stem, reheating the end of the said stem if found necessary and then pressing a foot onto the end of said stem to form a stemmed and footed glass article having a seamless bowl and stem which closely approximates in quality the articles produced by much slower and more costly hand methods.

One illustrative embodiment of this invention is shown in the accompanying drawings wherein similar reference numerals designate corresponding parts in the several figures and wherein—

Figure 1 is a vertical sectional view of a press mold for forming integral bowl blanks and stems;

Figure 2 is a vertical sectional view of a blow mold in which the bowl blank is blown;

Figure 3 is a fragmentary perspective view of a foot mold and device for supporting an article formed as in Figure 2 during attachment of a foot;

Figure 4 is a vertical sectional view of the foot mold shown in Figure 3;

Figure 5 is a plan view of a stem reheating apparatus;

Figure 6 is a sectional view taken on line 6—6 of Figure 5; and

Figure 7 is a fragmentary plan view showing the relation of two foot molds mounted upon the table of a forming machine.

In the drawings, and particularly in Figures 1 and 2, my invention is shown as comprising a press mold 1 and a blow mold 2, both of a type designed for the manufacturing of goblets.

The press mold 1 comprises a bowl blank forming portion 3 and a stem forming portion 4. The entire mold may be supported by a mold bottom member 5 which, in turn, may be carried by the table of a suitable forming machine in a well-known manner. The stem forming portion 4 of the press mold 1 may be formed with an inwardly extending shoulder 6 and an opening 7, into which the stem 8 of a reciprocable ejector 9 extends. The ejector 9 may be supported by a shoulder 10 formed on the basket 5, and the stem 8 is preferably of a length to rest flush with the top of shoulder 6 when ejector 9 is being supported by shoulder 10, as shown in Figure 1. The stem 8 fits opening 7 loosely enough to permit air to escape from the stem forming portion 4 of mold 1 during the pressing operation. It is important to note that the ejector stem 8 is of different diameter than the stem of the glass blank. In the form shown it is of less diameter. Experience has shown that, if the ejector stem is of the same diameter, the pressing of the blank will result in the formation of a fin of glass depending from the glass blank stem and that this will break off and fall down between the elevated ejector stem and the walls of the stem mold and prevent the ejector from descending after the stem and blow blank have been removed from the mold. In other words, the particles of glass detached from the fin depending from the stem will become wedged between the ejector and mold if the bottom of the stem mold is of the same size as the ejector, whereas if the ejector stem is slightly smaller than the stem forming portion of the mold no fin will be formed and the above difficulties will not arise.

The upper part of the bowl blank forming portion 3 of press mold 1 may be recessed as at 11 to form part of a bead mold 12, the other part of which may be formed by a recess 13 formed in the ring mold 14. A plunger 15, which may be fluted as at 16, is designed to cooperate with press mold 1 to form the bowl blank 17 and integral stem 18 from a mass or charge of glass previously placed in mold 1.

When a charge of glass has been placed in mold 1, either by an automatic feeding machine or manually, the plunger 15 descends into the mold and forms an article of substantially the shape shown in Figure 1. When the pressing operation has been completed, the plunger 15 is removed from the mold 1 and the ring mold 14 elevated. The ejector 9 and its stem 8 may next be moved upwardly to elevate the pressed article from the mold 1 high enough to permit engagement of the bead 19 by a transfer mechanism which carries the article laterally and deposits it in the blow mold 2, as shown in Figure 2. If desired the inside of the bowl blank may be polished by a jet of flame before or after blowing.

The blow mold 2, which is preferably of the block type, comprises a bowl forming portion 20 and a stem receiving portion 21, and the entire mold may be supported in a basket member 22, which may be formed with a shoulder 23 for carrying a reciprocable ejector 24 that has a stem 25 which fits into the stem receiving portion 21 as shown in Figure 2. At its top the blow mold 2 may be provided with open and shut mold halves 26 which are formed with shoulders 27 for supporting the pressed article by bead 19 during blowing. The position and shape of the article before and after blowing is indicated in Figure 2 by the full and dotted lines. As a result of blowing, a bowl 28 having a shoulder 29 is formed from the bowl blank 17.

When the bowl 28 has been formed as just described, the mold sections 26 may be opened and the blown article comprising the integral stem 18, blown blank 28, shoulder 29 and bead 19 removed from the blow mold 2. The removal may be assisted by elevating stem 25 of ejector 24, which contacts with the bottom of stem 18 as shown in Figure 2.

Under some conditions the article may now be transferred directly to the foot mold and the foot attached without preliminarily reheating the stem, but in the ordinary operation of my invention, I prefer to reheat the end of the stem before attaching the foot.

For the purpose of reheating the stem before attaching the foot, I preferably provide a plurality of furnaces 31, which may be mounted upon a base 32 conveniently located with reference to the other parts of the apparatus. Each furnace may be constructed with side walls 33, preferably of refractory material, and a bottom 34 which may rest upon the base 32. The walls 33 of each furnace may be provided with oppositely disposed openings 35 and 36, into which the burners 37 project as shown in Figures 5 and 6. Along the sides of base 32 extend an air pipe 38 and a gas pipe 39 which supply mixtures of gas and air to the burners 37 by means of extensions 40 and 41, which may be provided respectively with suitable valves 42 and 43 for controlling the relative quantities of gas and air supplied to the burners 37 and, consequently, the temperature in the furnaces 31.

Above and in alignment with the furnaces 31 are provided cup members 44 which may be supported by the bifurcated portions 45 of suitable standards 46, which may be secured to the base 32 as at 47. When the blown article has been removed from the blow mold it may be placed in one of the cups 44 so that the stem 18 extends into the heated furnace as shown in Figure 6. Several articles may be reheated in the several furnaces and kept ready for attachment of the feet thereto as the foot molds are successively presented. It is only necessary to reheat the end of the stem 18 so that a foot may be pressed and welded thereto as hereafter described.

The apparatus employed for attaching the foot comprises an article support 48, which is preferably vertically adjustable by means of nut 49 which co-acts with extension 50 and rests upon boss 51 carried by table 52, as shown in Figures 3 and 4. The article support 48 may be provided with a member 53 which is designed to support the blown article by its shoulder 29, as shown in Figure 4. The member 53 may be of asbestos or other suitable material and formed with a central opening 54 into which the bead 19 extends. Obviously the member 53 may be designed so that the bead 19 assists the bowl shoulder in supporting the article during attachment of the foot, or the bead 19 may be caused to support the article entirely during attachment of the foot.

The foot mold proper may be mounted upon a table 55 which is in superimposed relation to and rotates in unison with table 52 so that the support 48 and the foot mold will always be properly aligned. The foot mold sections 56 and 57 may be formed with extending lugs 58 and 59, pivoted to a post 60 which extends through the table 55. The foot mold sections 56 and 57 may be opened and closed by means of lever 61 operated by a cam or the like on the center post of the forming machine and extensions 62 and 63 which are adapted to be grasped by a suitable tong arrangement to hold the mold sections securely shut during the pressing operation. Each mold section is formed with a recess 64 to enclose the stem of the article, when supported as shown in Figure 3. The stem of the article may extend into the cavity 65 shown in Figure 4 so that the glass used in forming the foot will be forced around the protruding end of the stem to form a substantial weld and enlargement between the stem and foot. A plunger 66 cooperates with the cavity 67 formed by the mold sections 56 and 57 to form the foot and weld it to the stem as shown in Figure 4.

Pivoted to the portion of post 60, which extends through table 55, are the centering devices 68 and 69 which interfit with the bottoms of mold sections 56 and 57, as best shown in Figure 3. The pivot lugs 70 and 71 of these devices are preferably formed with extensions 72 and 73, which may be connected to the similar portions of adjacent foot molds by the springs 74 which normally tends to close the devices 68 and 69, but complete closing is prevented by pins 75 formed on the lugs 76 carried by such centering devices 68 and 69, engaging with the mold sections 56 and 57, as shown in Figure 7. It will be noted from Figures 3 and 7 that the devices 68 and 69 extend out from the mold sections 56 and 57 so that as the mold sections are closed, the devices 68 and 69 will first engage the stem of the article supported by support 48 and center it between the serrated notches 77 as the mold sections continue to close about the stem. When the foot has been pressed upon the stem enclosed between notches 77 and recesses 64 the mold sections are opened but the centering devices 68 and 69 are maintained in closed position about the stem by springs 74 until the pins 75 are again engaged by the mold sections. The devices 68 and 69, because of their resilient action, operate to engage the stem before the mold sections close and to hold it until the mold sections move out of contact with the formed foot. This avoids breakage of the stems, which might occur if the foot should stick to one of the foot mold sections or the stem not be properly centered when the mold sections were closed.

The operation of the foot mold is clearly seen from Figures 3 and 4. The article produced as heretofore described is placed upon support 48 and its stem is positioned between the foot forming mold sections, which now close about the stem as centered by the devices 68 and 69. A charge of glass is now placed in the cavity 67 and the plunger 66 descends to form a foot and weld it to the stem, which preferably projects into cavity 65. The adjustability of support 48 permits the stem to be held in any vertical position with reference to the mold sections so that the foot may be pressed directly onto the end of the stem or around it as heretofore described. The serrations in notches 77 of devices 68 and 69 prevent the stem from adhering thereto and prevent too rapid cooling of the stem. When the foot has been attached the article may be completed by fire-polishing, annealing and cracking off the shoulder 29 in the usual manner. From the foregoing description, it will be apparent that I have produced a method and apparatus for manufacturing stemmed and footed glassware which produces an article closely resembling expensive hand-made articles and makes possible the use of machinery with a consequent increase in production, decrease in cost and greater uniformity of product.

An important feature of this invention resides in the fact that no well is formed in the stem as a result of blowing. It is believed that this results from the relative shape of the press mold and blow mold, inasmuch as it is believed that if the bowl is blown out rather abruptly with relation to the stem, that the stem will be lifted from the bottom of the mold during the initial expansion and then expanded downwardly when the bowl is being fully formed, thereby forming a "well" or cavity in the stem which greatly detracts from the appearance and salability of the article. This defect of a "well" in a stem is avoided in the present invention apparently by the gradual shaping of the bowl cavity away from the stem to prevent elevation and later depression of the stem which occurs when the bowl and stem portions of the blow mold meet at an abrupt angle. Whether or not this is the correct or sole factor in elimination of the well, the fact is that the method and apparatus described herein do eliminate the "well" and I believe I am the first to accomplish this.

From the foregoing description, it will be apparent that I have produced a method and apparatus for manufacturing stemmed and footed glassware which produces an article closely resembling expensive hand-made articles and make possible the use of machinery with a consequent increase in production, decrease in cost and greater uniformity of product.

Having thus described my invention, what I claim is:

1. In apparatus for manufacturing stemmed and footed glassware, the combination of a foot mold, resilient means for centering the stem of an article and adjustable means for supporting the bowl and stem of said article.

2. In apparatus for manufacturing stemmed and footed glassware, a mold for attaching a foot to the stem of an article, said mold embodying yieldable means for centering said stem.

3. In apparatus for manufacturing stemmed and footed glassware, the combination of a mold in which a foot is attached to the stem of an article and resilient means for centering said stem with relation to said mold.

4. A mold for attaching a foot to the stem of an article comprising foot mold sections and means cooperating with said sections and automatically effective for enclosing the stem before the mold sections close and for holding said stem when the mold sections open.

5. Apparatus for attaching the foot to a stemmed article comprising means for supporting the article, open and shut foot mold sections and means for resiliently holding the stem in fixed position during opening and closing of said mold sections.

6. Apparatus for attaching a foot to the stem of an article comprising adjustable means for supporting the article, foot mold sections adapted to open and close about said stem and means for resiliently maintaining said stem in fixed position during opening and closing of said foot mold sections.

7. In apparatus for manufacturing stemmed and footed glassware, the combination of open and shut foot mold sections, and yieldable means for centering the stem of the article during closing and opening of said mold sections, said means being operable by said mold section.

8. In apparatus for manufacturing stemmed and footed glassware, the combination of a mold for attaching a foot to the stem of an article, and yieldable means for centering said stem with relation to said mold, said centering means being operable by said mold.

In testimony whereof I hereby affix my signature.

VIRGIL O. CORNWELL.